(12) United States Patent
McCarthy et al.

(10) Patent No.: US 9,160,978 B2
(45) Date of Patent: Oct. 13, 2015

(54) METHOD AND APPARATUS RELATED TO VARIABLE DURATION MEDIA SEGMENTS

(75) Inventors: Sean T. McCarthy, San Francisco, CA (US); Thomas L. Du Breuil, Ivyland, PA (US); Gary Hughes, Chelmford, MA (US); Mark R. Magee, Campbell, CA (US); Wendell Sun, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 346 days.

(21) Appl. No.: 13/206,892

(22) Filed: Aug. 10, 2011

(65) Prior Publication Data
US 2012/0042091 A1 Feb. 16, 2012

Related U.S. Application Data

(60) Provisional application No. 61/372,229, filed on Aug. 10, 2010.

(51) Int. Cl.
G06F 15/16 (2006.01)
H04N 7/173 (2011.01)
H04N 21/234 (2011.01)
H04N 21/2343 (2011.01)
H04N 21/262 (2011.01)
H04N 21/61 (2011.01)
H04N 21/6373 (2011.01)
H04N 21/6377 (2011.01)
(Continued)

(52) U.S. Cl.
CPC ..... H04N 7/17318 (2013.01); H04N 21/23418 (2013.01); H04N 21/23439 (2013.01); H04N 21/26258 (2013.01); H04N 21/6125 (2013.01); H04N 21/6373 (2013.01); H04N 21/6377 (2013.01); H04N 21/658 (2013.01); H04N 21/8455 (2013.01); H04N 21/8456 (2013.01)

(58) Field of Classification Search
None
See application file for complete search history.

(56) References Cited

U.S. PATENT DOCUMENTS 5,917,830 A * 6/1999 Chen et al. ............... 370/487
7,680,855 B2    3/2010 Hyder et al.
(Continued)

FOREIGN PATENT DOCUMENTS

WO     2007130695 A2    11/2007

OTHER PUBLICATIONS

Patent Cooperation Treaty, International Search Report and Written Opinion of the International Searching Authority for International Application No. PCT/US2011/047285, Nov. 4, 2011, 11 pages.

Primary Examiner — Jason K. Gee
Assistant Examiner — Olanrewaju Bucknor
(74) Attorney, Agent, or Firm — Lowenstein Sandler LLP

(57) ABSTRACT

A method and apparatus for an adaptive bit rate system (300) that includes a media segmenter (304). The media segmenter divides a streaming media content into a plurality of variable duration segments wherein a first of the plurality of variable duration segments has a duration different from a second of the plurality of variable duration segments so that one of the plurality of variable duration segments ends at a determined discontinuity in the streaming media content. The system also can include an encoder (302) for encoding the variable duration segments of the streaming media content. In addition, the system includes an adaptive bit rate server (306) for storing and transmitting the variable duration segments of the streaming media content.

24 Claims, 16 Drawing Sheets

(51) Int. Cl.
*H04N 21/658* (2011.01)
*H04N 21/845* (2011.01)

(56) References Cited

U.S. PATENT DOCUMENTS

| | | | | |
|---|---|---|---|---|
| 8,019,885 B2* | 9/2011 | Yu et al. | | 709/232 |
| 8,032,649 B2* | 10/2011 | Gupta et al. | | 709/219 |
| 8,214,516 B2* | 7/2012 | Gupta et al. | | 709/231 |
| 8,892,691 B2* | 11/2014 | Pantos et al. | | 709/219 |
| 2002/0107940 A1* | 8/2002 | Brassil | | 709/219 |
| 2002/0196850 A1* | 12/2002 | Liu et al. | | 375/240.12 |
| 2009/0048836 A1* | 2/2009 | Bellegarda | | 704/249 |
| 2009/0282162 A1* | 11/2009 | Mehrotra et al. | | 709/233 |
| 2010/0145691 A1* | 6/2010 | Bellegarda | | 704/211 |
| 2010/0159303 A1 | 6/2010 | Rock et al. | | |
| 2010/0189183 A1* | 7/2010 | Gu et al. | | 375/240.28 |
| 2011/0096828 A1* | 4/2011 | Chen et al. | | 375/240.02 |
| 2011/0122939 A1* | 5/2011 | Ganesan et al. | | 375/240.01 |
| 2011/0191577 A1* | 8/2011 | Tian et al. | | 713/150 |
| 2011/0239078 A1* | 9/2011 | Luby et al. | | 714/752 |
| 2011/0246623 A1* | 10/2011 | Pantos et al. | | 709/219 |

* cited by examiner

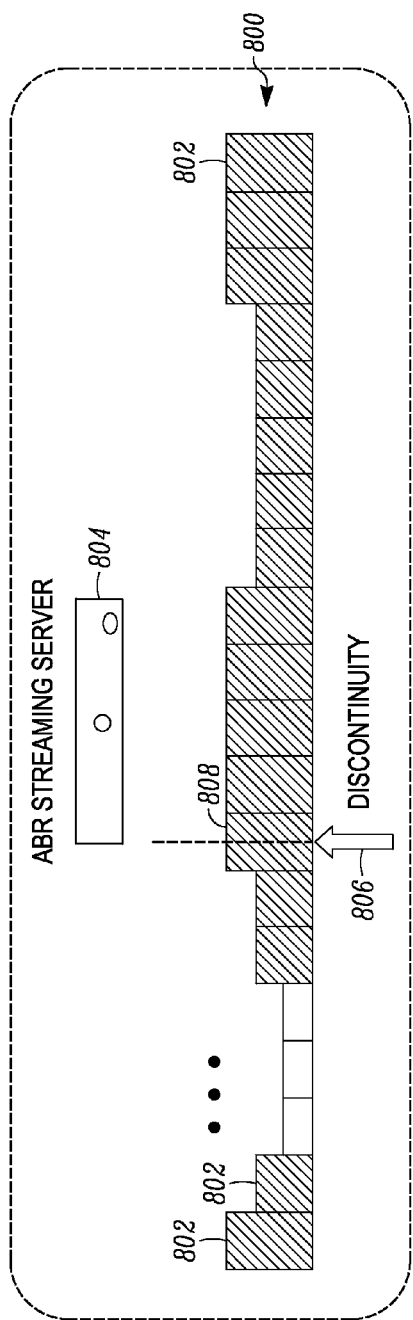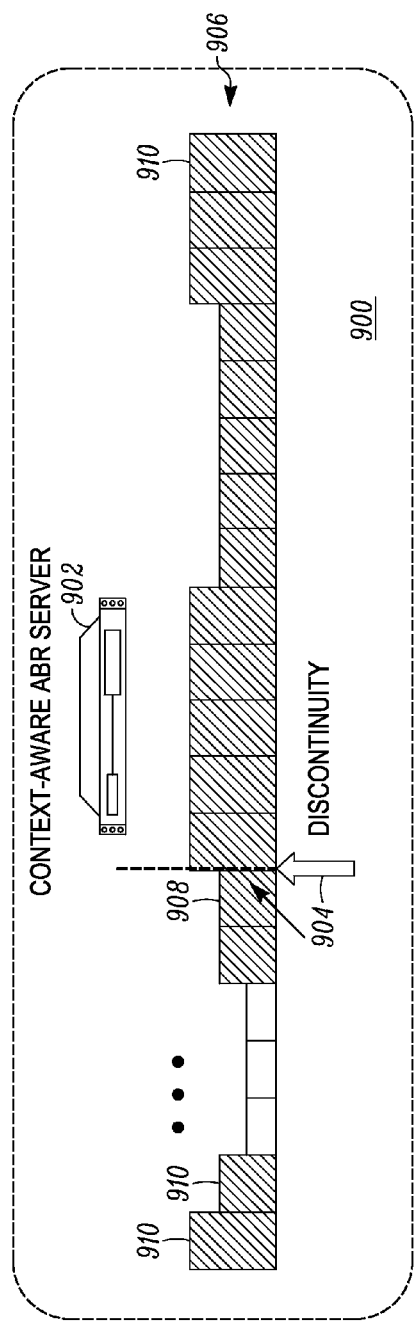

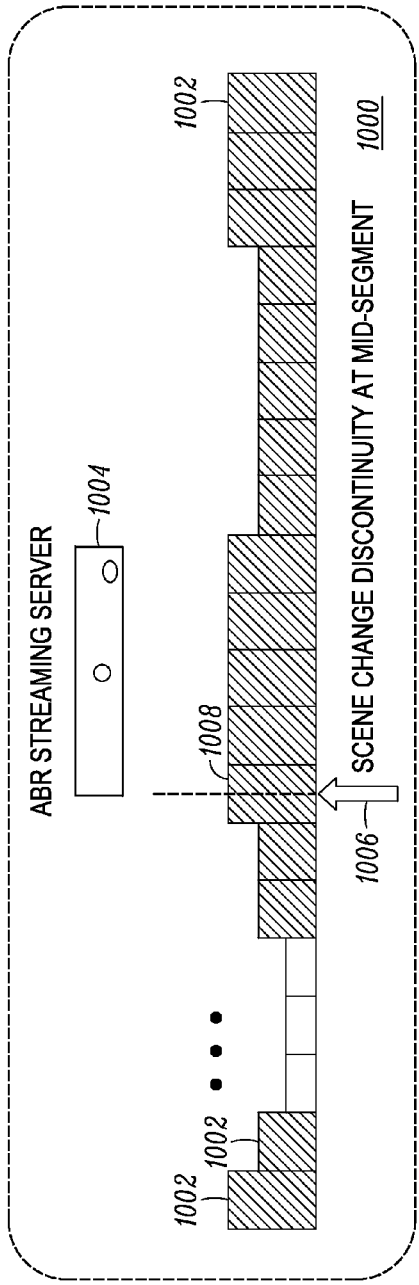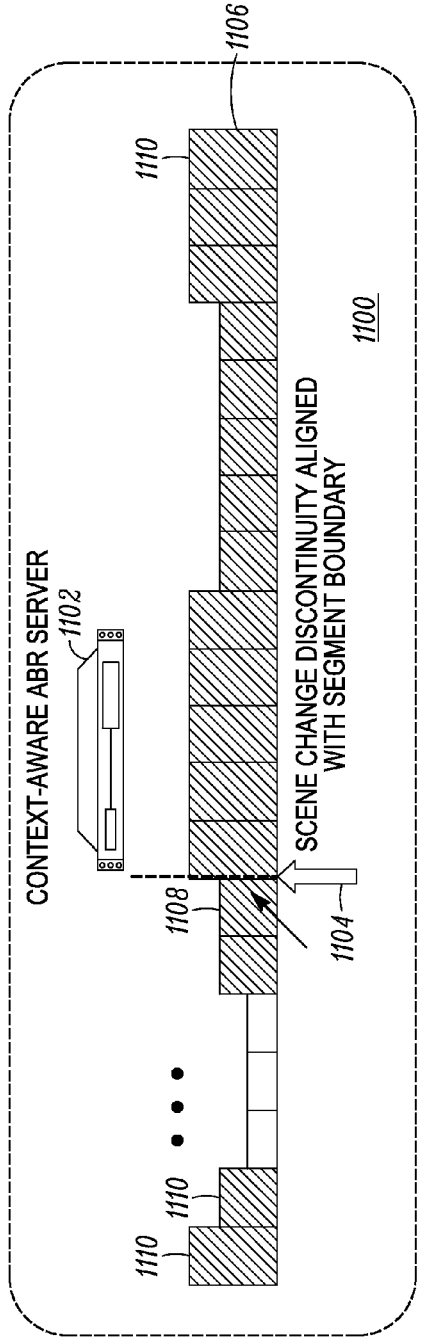

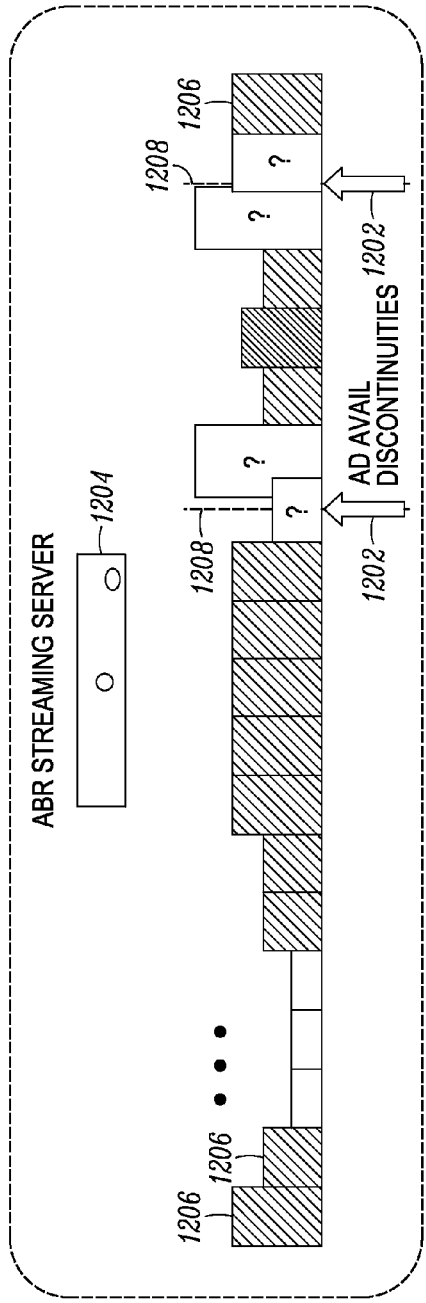
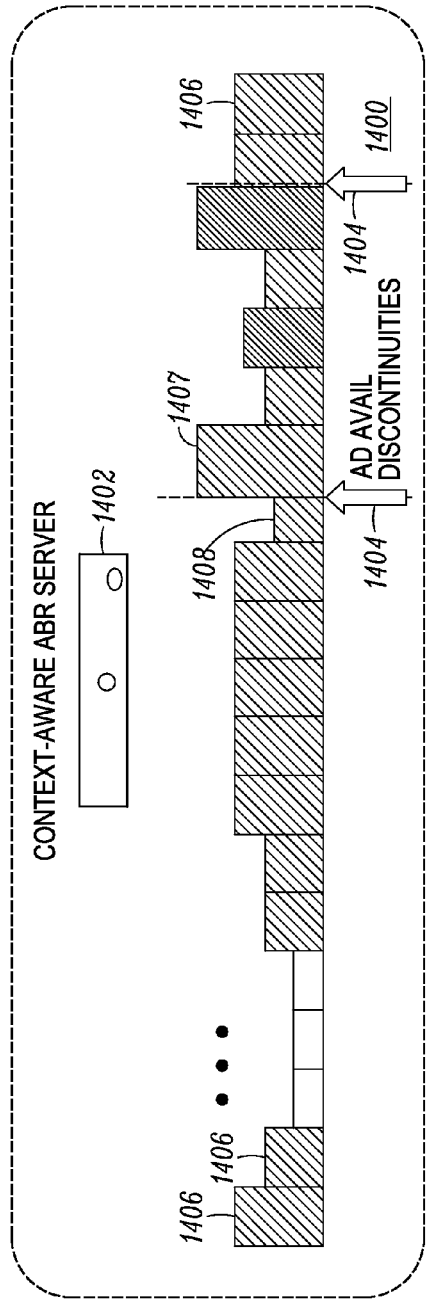

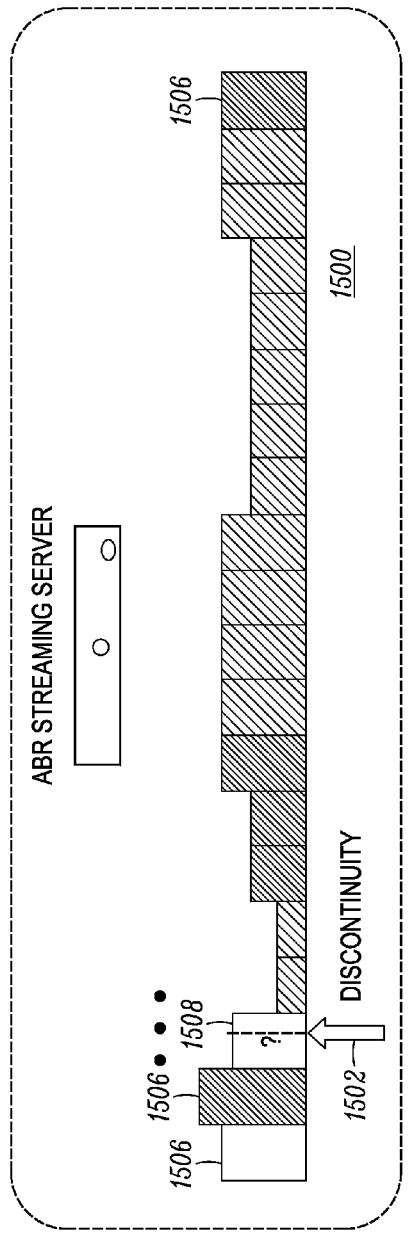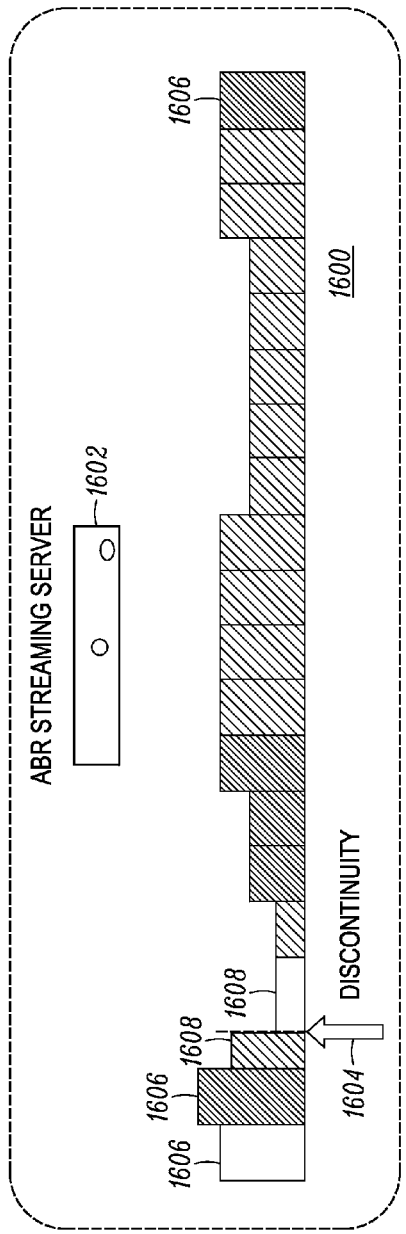

US 9,160,978 B2

METHOD AND APPARATUS RELATED TO VARIABLE DURATION MEDIA SEGMENTS

CROSS-REFERENCE TO RELATED APPLICATIONS

This application claims priority on U.S. Patent Application No. 61/372,229 filed Aug. 10, 2010, which is hereby incorporated by reference into this application.

FIELD OF THE INVENTION

The present invention relates to streaming media content and, in particular, where the streaming media content is divided into variable duration media segments for transmission.

BACKGROUND

Streaming media content can be divided into segments having a fixed duration. Adaptive Bit Rate (ABR) streaming protocols have been also been developed. ABR is a method of streaming media content where sequential HTTP progressive downloads in which a continuous media program is delivered as a series of sequential media segments or chunks. It is these sequential media segments that are known to have a fixed duration.

FIG. 1 illustrates an overview of some ABR use cases. As shown, the content owners 102 provide a wide variety of media content that are accessed by consumers 106. This media content includes television, cable and other audio/visual programming that is provided through traditional channels such as broadcast and cable television as well as alternative methods such as via the internet. The content owners and providers supply the media content to operators 104 such as broadcast and cable television operators as well as other types of data providers through the internet 108 and various wireless technologies. These operators provide the streaming of the media content to the end consumers.

In known ABR techniques 110, the segments that are formed from the streaming media content are of a fixed duration. This fixed duration, however, may not be ideal for streaming all of the media content because of various changes within the media content. Thus, at discontinuities in the streaming media content, encoding efficiency is compromised. And at boundaries such as between programs or desired ad insertion locations, the fixed duration segments do not align properly with the actual content, resulting in "gaps" or "overlap" of media content when switching content.

Alternatives to previously used ABR techniques have proposed to alter the fixed duration of the segments by dividing the media streaming into segments having different fixed durations by allowing this parameter to be provisioned or configured when the service is created. Nonetheless, each of the segments still has the same duration even though the duration of the segments is different than the duration of previously used segments. This does not overcome the deficiencies of other ABR methods using fixed duration segments.

In view of the foregoing, alternative methods of ABR are needed to better accommodate performance and distribution needs of the media content and distributors.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 8 illustrates fixed duration segments with a discontinuity occurring in a segment according to the prior art.

FIG. 9 illustrates variable duration segments with a discontinuity occurring at the end of a segment according to an embodiment of the present invention.

FIG. 10 illustrates fixed duration segments with a scene change discontinuity occurring in a segment according to the prior art.

FIG. 11 illustrates variable duration segments with a scene change discontinuity occurring at the end of a segment according to an embodiment of the present invention.

FIG. 13 illustrates fixed duration segments with ad avail discontinuities occurring in a segment according to the prior art.

FIG. 14 illustrates variable duration segments with ad avail discontinuities occurring at the end of a segment according to an embodiment of the present invention.

FIG. 15 illustrates fixed duration segments with a channel change discontinuity occurring in a segment according to the prior art.

FIG. 16 illustrates variable duration segments with channel change discontinuities occurring at the end of a segment according to an embodiment of the present invention

Figure 1:
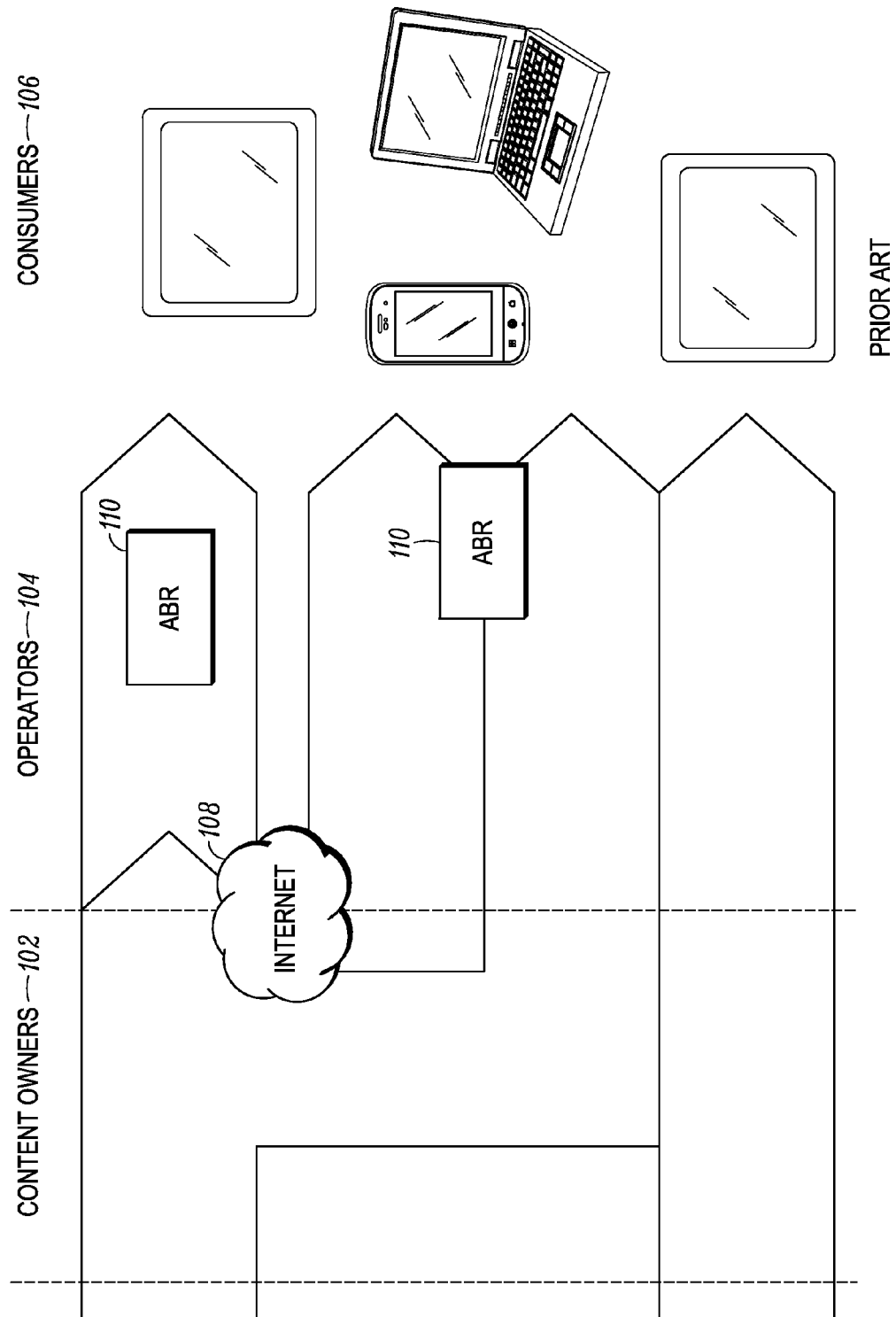
FIG. 1 is an illustration of a use case in which adaptive bit control can be used when streaming media content as is known in the prior art.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to method and apparatus related to variable duration media segments for streaming media content using adaptive bit rate streaming protocols. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of variable duration media segments used in streaming media content as described herein. The non-processor circuits may include, but are not limited to, a radio receiver, a radio transmitter, signal drivers, clock circuits, power source circuits, and user input devices. As such, these functions may be interpreted as steps of a method to perform streaming media content using variable duration segments. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention relates to a method of streaming media content using variable duration segments. The method includes streaming media content and determining appropriate locations to create segment boundaries at what otherwise may become discontinuities in the streaming media content. The method divides the streaming media content into a plurality of variable duration segments. The first of the plurality of variable duration segments may have a duration different from the second of the plurality of variable duration segments so that one of the plurality of variable duration segments ends at the desired location in the streaming media content. The method also transmits the variable duration segments of the streaming media content.

In an embodiment, the segment boundaries or discontinuities are determined in the streaming media by analyzing content of the streaming media content for boundaries where the streaming media content changes. The boundaries can be determined by at least one of: Analyzing the streaming media content for scene change boundaries; analyzing the streaming media content for ad avail boundaries; analyzing the streaming media content for channel changes, and analyzing the streaming media content for program information such as access information. Moreover, the analyzing can be done using multiple rates and multiple formats.

In another embodiment, the duration of variable duration segments is figured out by determining a duration of the plurality of variable duration segments and extending or decreasing the duration of at least one the plurality of variable duration segments as compared to the duration of the other variable duration segments so that the one of variable duration segments ends at the determined discontinuity in the streaming media content.

The streaming media content can be encoded and metadata can be used to signal start points and endpoints of the variable media segments. The method can also divide the streaming media content into a plurality of variable duration segments such that the discontinuities are aligned with an endpoint of the one of the plurality of variable duration segments. Moreover, the method can determine the best segment duration for the variable duration segments.

In addition, an ABR system can be provided that includes a media segmenter. The media segmenter divides streaming media content into a plurality of variable duration segments wherein a first of the plurality of variable duration segments may have a duration different from a second of the plurality of variable duration segments so that one of the plurality of variable duration segments ends at a determined discontinuity in the streaming media content. The system also can include an encoder for encoding the variable duration segments of the streaming media content. In addition, the system includes an adaptive bit rate server for storing and transmitting the variable duration segments of the streaming media content.

Figure 2:
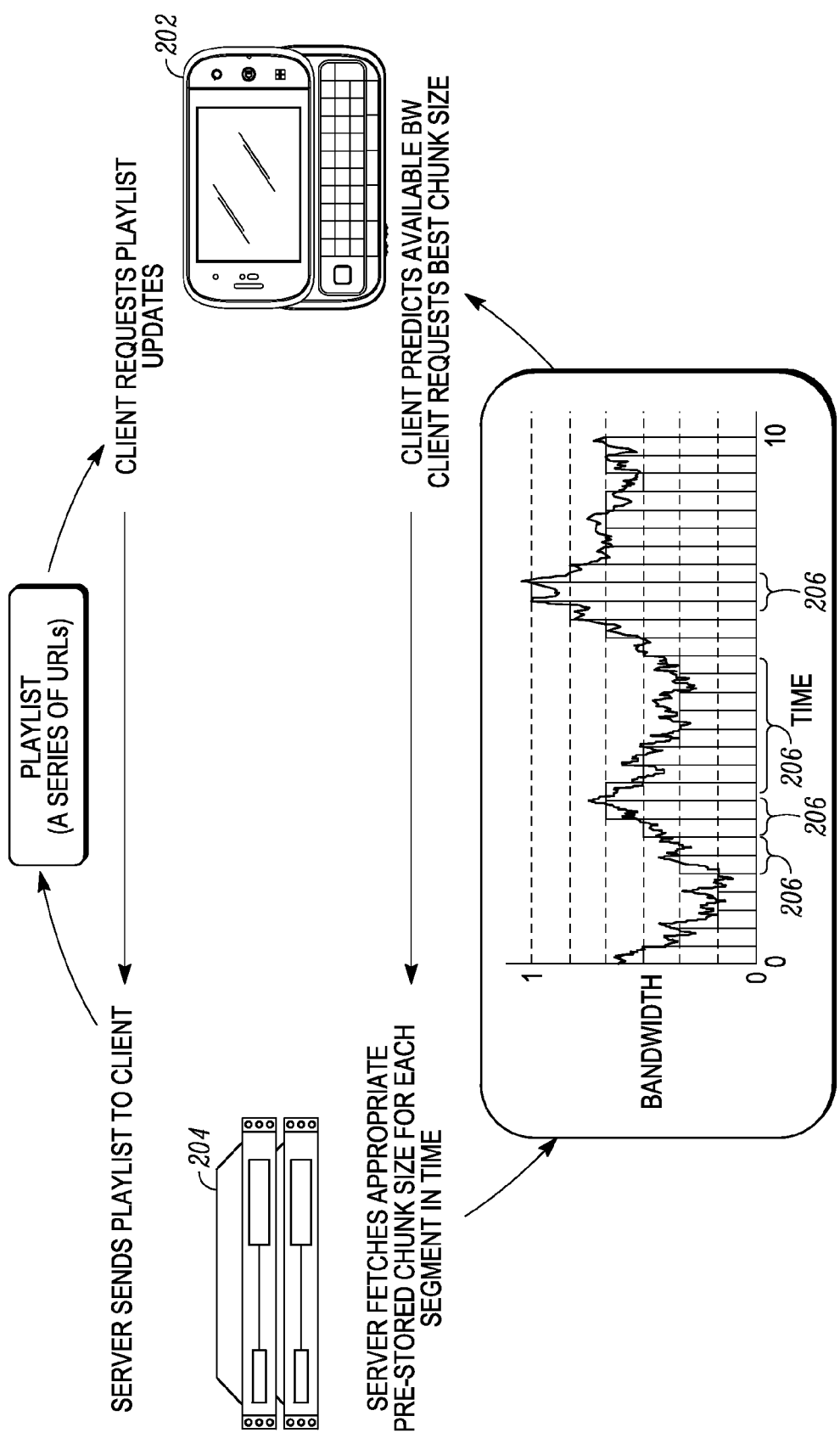
FIG. 2 is an illustration of an approach of delivering adaptive bit control streaming media content.

Turning to FIG. 2, there is shown an illustration of an approach to operate an adaptive bit rate (ABR) streaming protocol system. A client using a device 202, which can be a mobile device (as shown) such as a cell phone, smart phone, laptop, netbook or tablet computer, or a fixed device (not shown) such as a television or desk top computer requests a playlist to be streamed to the device. Such a playlist can consist of an audio or visual component such as music and video files. The request is made to a server 204. In response to the request, the server 204 provides the playlist to the client as a series of URLs or other references to streaming media content. In an embodiment, when the device 202 requests the playlist from the server 204, the device 202 can predict, based on various factors, the available bandwidth that can be used to have the media content streamed from the server 204 to the device 202. Based on its knowledge of the available bandwidth, the device 202 can request the best segment size to stream the media content. The request for the segment size is provided to the server 204. In response to receiving the request, the server 204 can acquire the media content in the appropriate size segments and provide that to the device 202. As will be explained in more detail below, server 204 can use variable duration segments 206 as it streams the media content to the device 202. As shown, the duration and bandwidth of the segments can vary from segment to segment.

Figure 3:
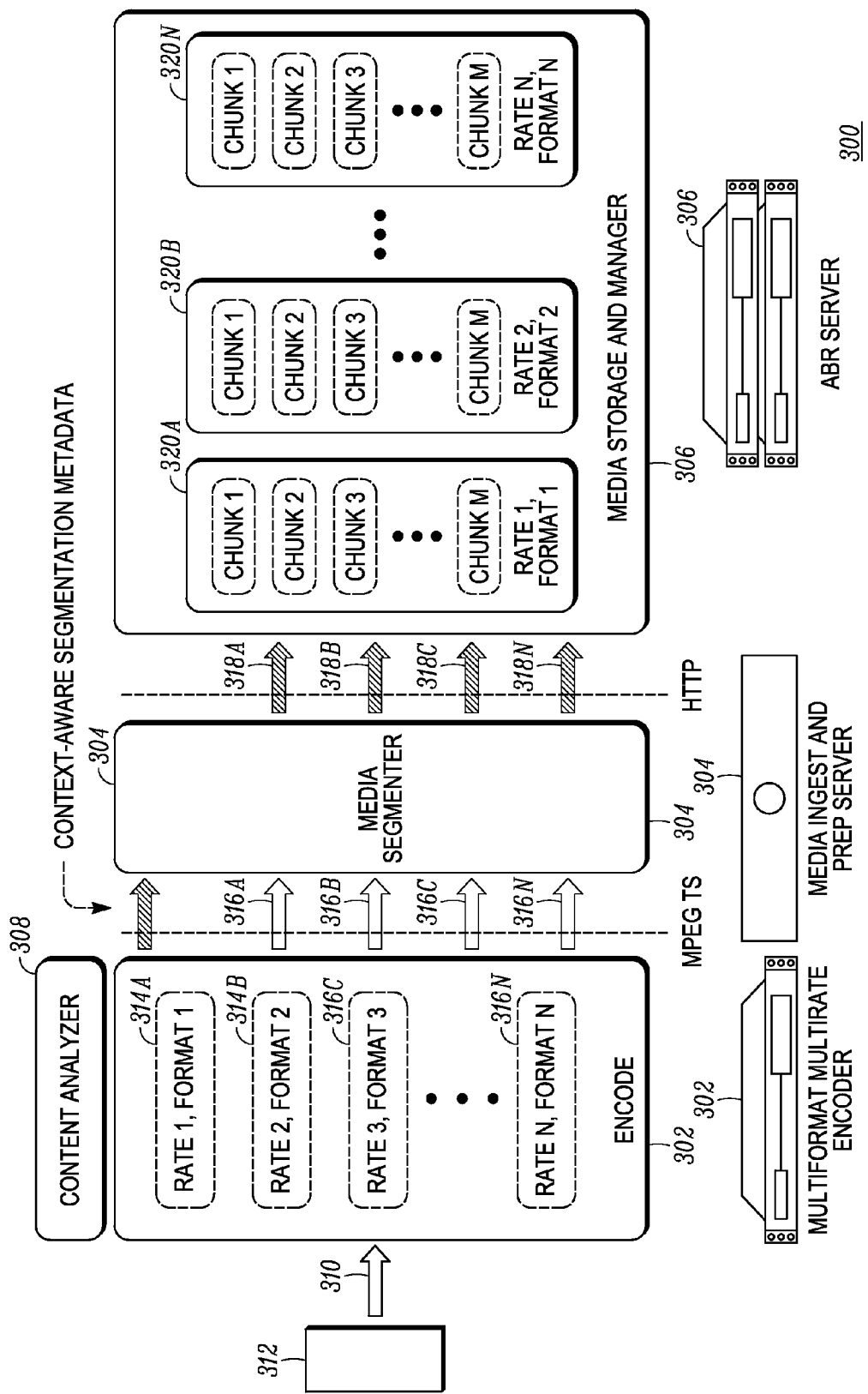
FIG. 3 illustrates an ABR streaming system that utilizes variable duration segments in accordance with embodiments of the present invention.

FIG. 3 illustrates an ABR streaming system 300 that utilizes variable duration segments to steam media content from a content provider to a consumer or client. The media content that is streamed in the system 300 includes both the audio and/or visual content as well as all control data that is used to stream the media content from a content provider to an end user. The audio/visual content and control data may be used and inserted into the streamlining media content by a content provider, an operator or and end user device. As understood, the media content can also include any associated signaling or metadata carried with the audio/visual content and control data such as, but not limited to, closed captions, multiple soundtracks, ad avail markers, program access markers, etc. As seen, the ABR streaming system 300 includes an encoder 302, a media segmenter 304 and an adaptive bit rate server 306. In addition, the content analyzer 308 can be provided. The content analyzer 308 is shown as a separate entity but it can also be a part of the encoder 302 or the media segmenter 304.

In an embodiment, the encoder 302 can be multirate and multiformat encoder that is therefore capable of encoding media content at various different rates and in different formats as is required by the media segmenter 304, the ABR server as well as the content provider 312 and the device 202. In an embodiment, the ABR server 306 can be a media storage and manager device that stores the variable duration segments and provides the variable duration segments to clients when they are requested. The encoder can receive an input signal 310 from a content provider 312. The content provider 312 is the source of the media content that is streamed to the device 202 by the system 300.

As the encoder is a multirate and multiformat encoder, the encoder 302 receives the input signal 310 and encodes the input stream using different rates and different formats. As shown, each different rate has a different format 314a-n although it is understood that different combinations can be used. The result of the encoder is output encoded signals 316a-n corresponding to the rate and format combinations of the encoder. In an embodiment, the output encoded signals 316a-n are configured by the encoder as MPEG transport stream (MPEG TS) signals. These encoded signals 316a-n are supplied to the media segmenter that creates the variable duration media segments signals 318a-n. The creation of the variable media segments and operation of the media segmenter is explained in more detail below. The variable media segment signals 318a-n are supplied to the ABR server 306 that also serves as the media storage and manager entity. In an embodiment, the media segmenter 304 provides signals that use HTTP protocols that are a part of the sequential HTTP downloads that are delivered to the client. Thus, the variable media segments signals 318a-n can be HTTP signals. The variable media segment signals 318a-n are supplied to the ABR server 306 and are converted into variable media segments 320a-n. Each of the variable duration segments 320a-n are stored in the ABR server 306 so that the ABR server can stream the requested media content to the device 202.

The content analyzer 308 is used to analyze the media content to determine where discontinuities in the content are. As is understood in the context of this disclosure, discontinuities in the content are those places within media content in which the media changes. These changes can occur for a variety of reasons, including but not limited to scene changes in the media content itself, ad avails that are provided within the media stream, which is where an advertisement can be inserted into the media stream, channel changes when a client changes from one source of media content to another source of media content. Discontinuities can also be designated by content provided within the media content at different places separate from such times as scene changes, ad avails and channel changes. These discontinuities can be in the form of program access information and other information regarding the content provider, the operator or other similar information.

The discontinuities can be used as within the streamed media content to coincide with the endpoint of a segment and the start point of the next segment as needed by the media segmenter 304. When a discontinuity occurs, it corresponds to a time or place, e.g. an end of the scene, when an ad avail is scheduled, a channel has been changed, in the streamed media content for the end of variable duration segment. Likewise, after the discontinuity, e.g. at the start of new scene, the beginning of an advertisement when the ad avail is provided, a channel has changed, for next variable duration segment to start.

In an embodiment, the content analyzer 308 can be coupled to the encoder 302. It is also possible to configure the encoder 302 to incorporate the content analyzer 308. When coupled to the encoder the content analyzer provides the media segmenter 304 where the discontinuities are within the encoded signals 316a-n. The media segmenter 304 then uses the encoded signals with discontinuities to determine the duration of the variable duration segments 318a-n that are provided to the ABR server 308. In another embodiment, the content analyzer 308 can be coupled to the media segmenter 308, or the media segmenter 308 is configured with the content analyzer. In this embodiment, the media segmenter 308 is provided with or determines the discontinuities that are then used to determine the duration of the variable duration segments 318a-n for use by the ABR server 308.

In an embodiment described, the media segmenter 304 receives the discontinuities from the media content analyzer 308. Alternatively, the media content analyzer 308 of the media segmenter 304 determines the discontinuities. With the understanding of the position within the media content stream of the discontinuities, the media segmenter can divide the media content into the plurality of variable duration segments. Because the discontinuities can occur at many different places within the media content stream or at multiple different times within the media content stream, the duration of each segment is not necessarily the same from one segment to the next segment, therefore creating the variable duration segments. The start point and end point in the media stream for each of the variable duration segments can be designated by the media segmenter 304 using metadata. In one embodiment, a standard duration of the media segments is used for all but the last segment of the media stream to the discontinuity. The duration of remaining the media segment can be extended so that the end point of the last segment ends when the discontinuity in the media stream occurs, or the duration can be decreased so that the end point of the last segment ends when the discontinuity in the media stream occurs. In another embodiment, a different segment within the plurality of segments can be extended or decreased so that end point of the last segment of the media stream ends when the discontinuity in the media stream occurs. In yet another embodiment, multiple segments of the variable duration segments can have different durations so that the end point of the last segment ends when the discontinuity in the media stream occurs.

Figure 4:
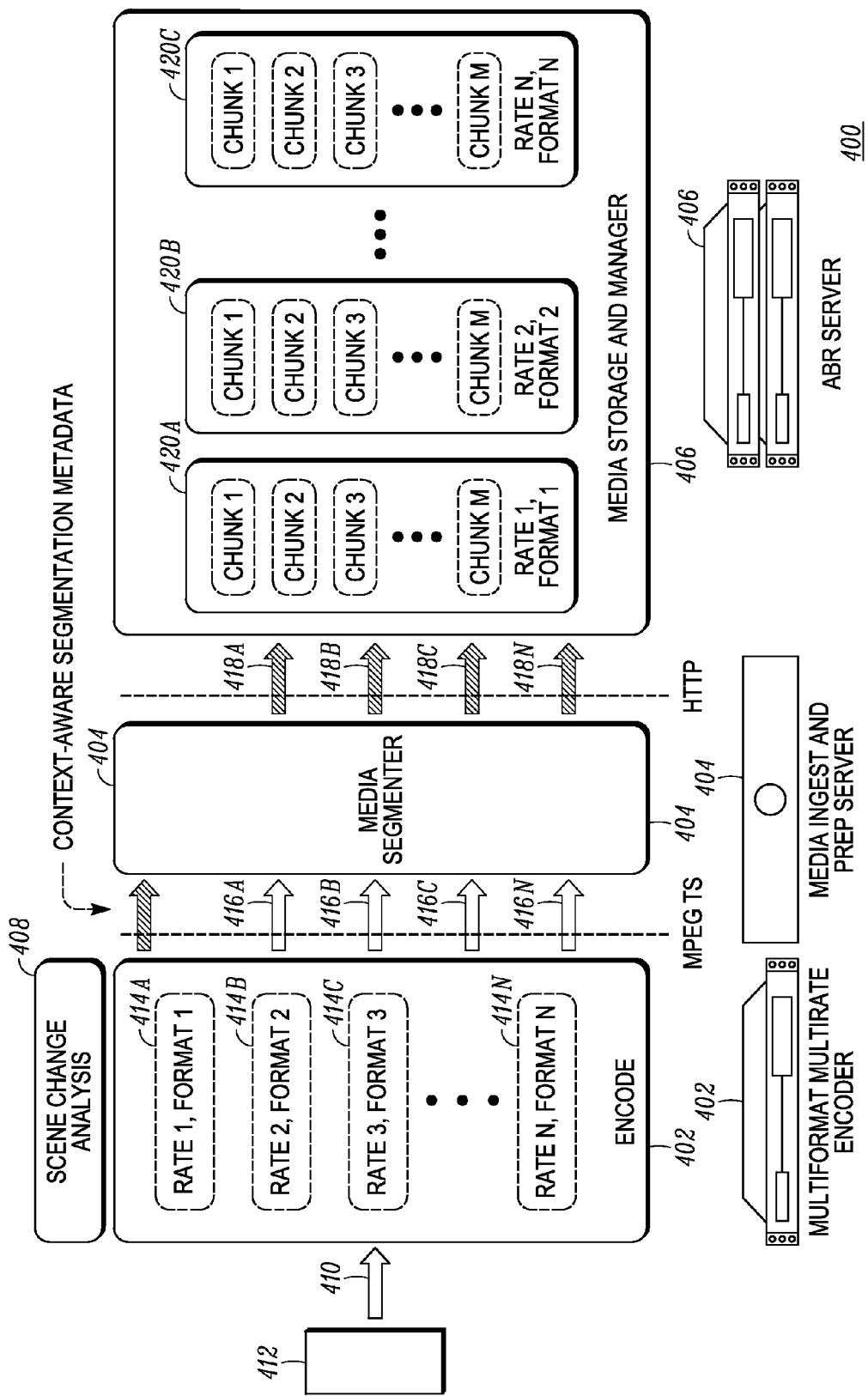
FIG. 4 illustrates an ABR streaming system that utilizes variable duration segments according to scene changes in accordance with embodiments of the present invention.
Figure 5:
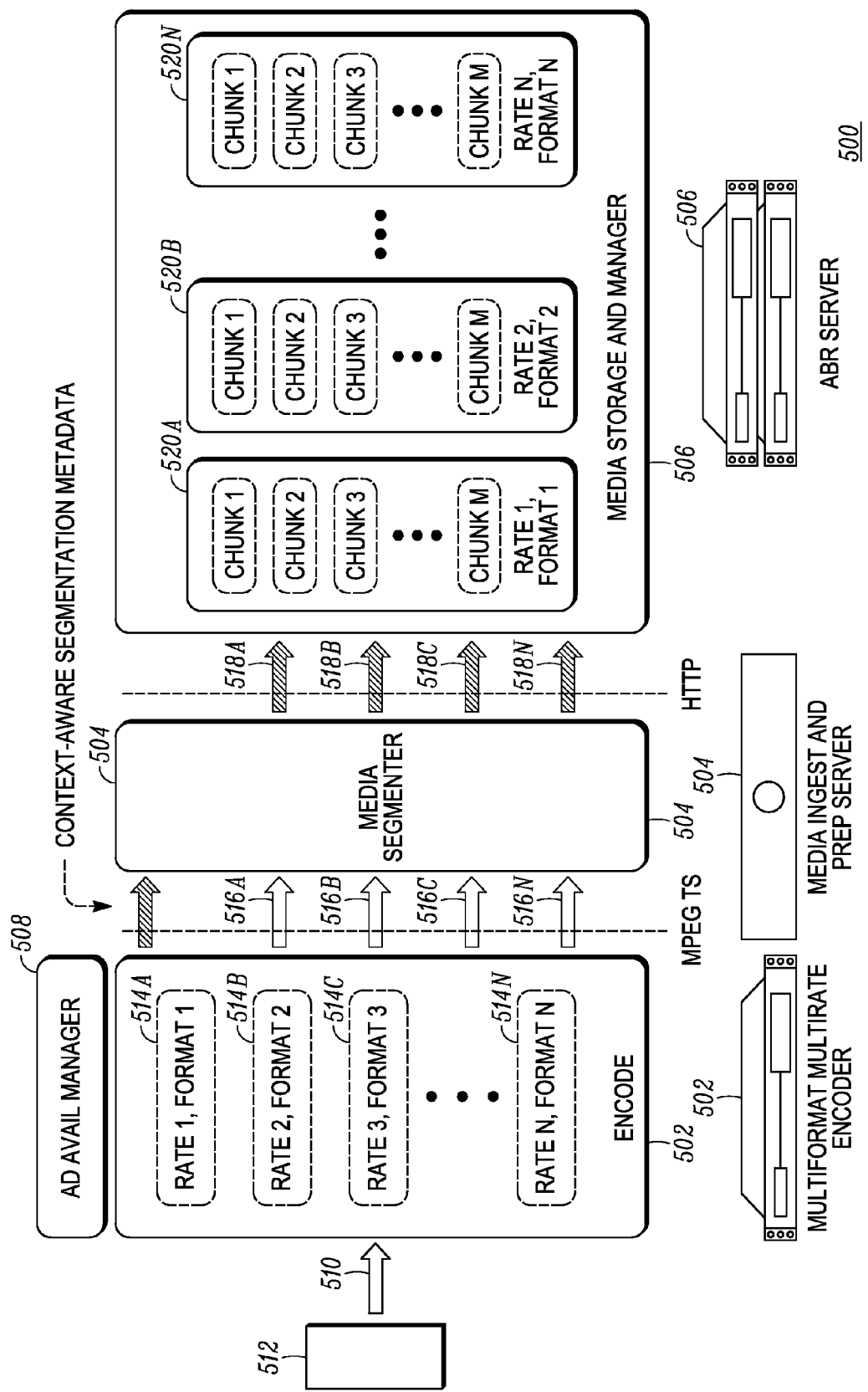
FIG. 5 illustrates an ABR streaming system that utilizes variable duration segments according to ad avails in accordance with embodiments of the present invention.
Figure 6:
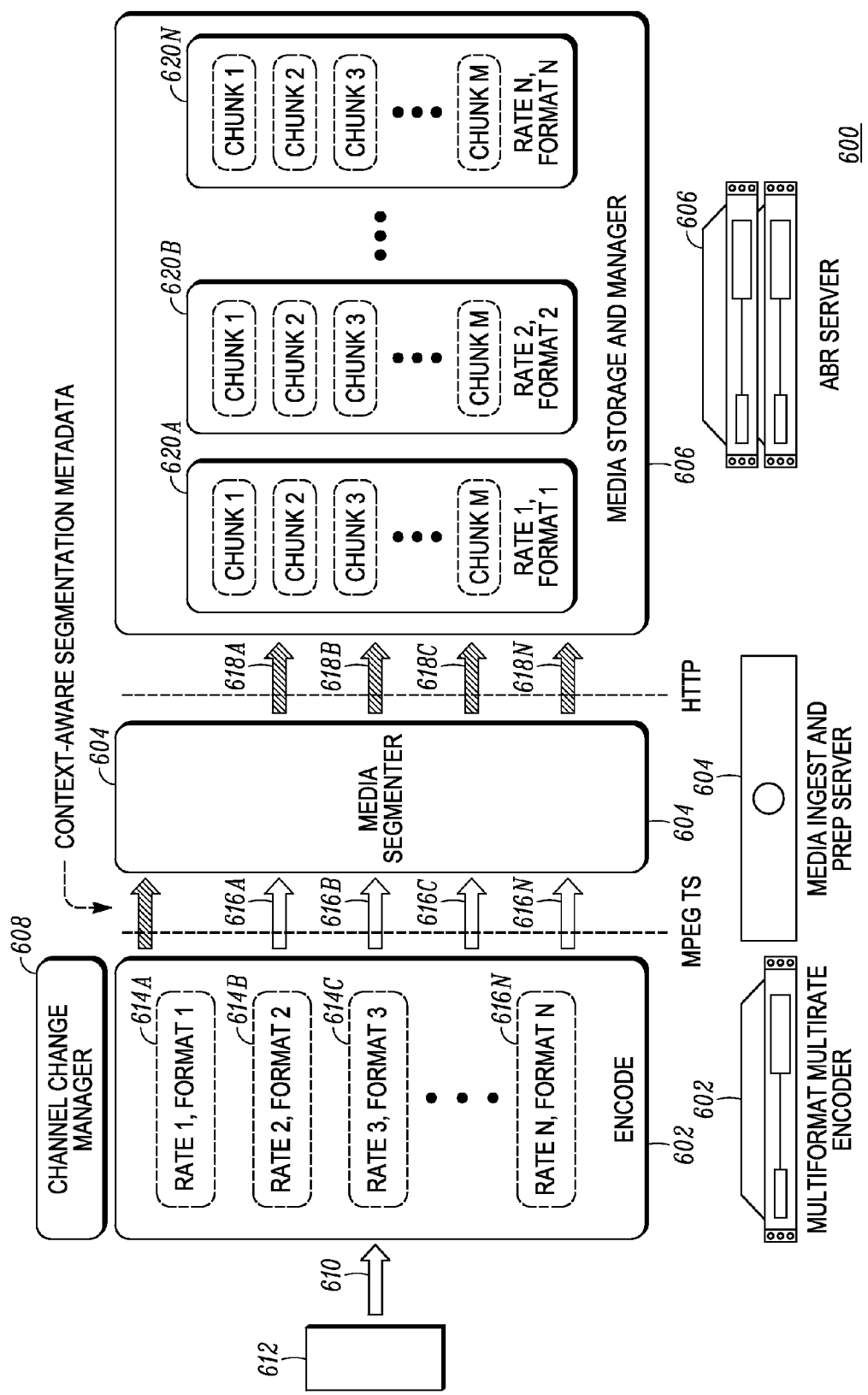
FIG. 6 illustrates an ABR streaming system that utilizes variable duration segments according to channel changes in accordance with embodiments of the present invention.
Figure 7:
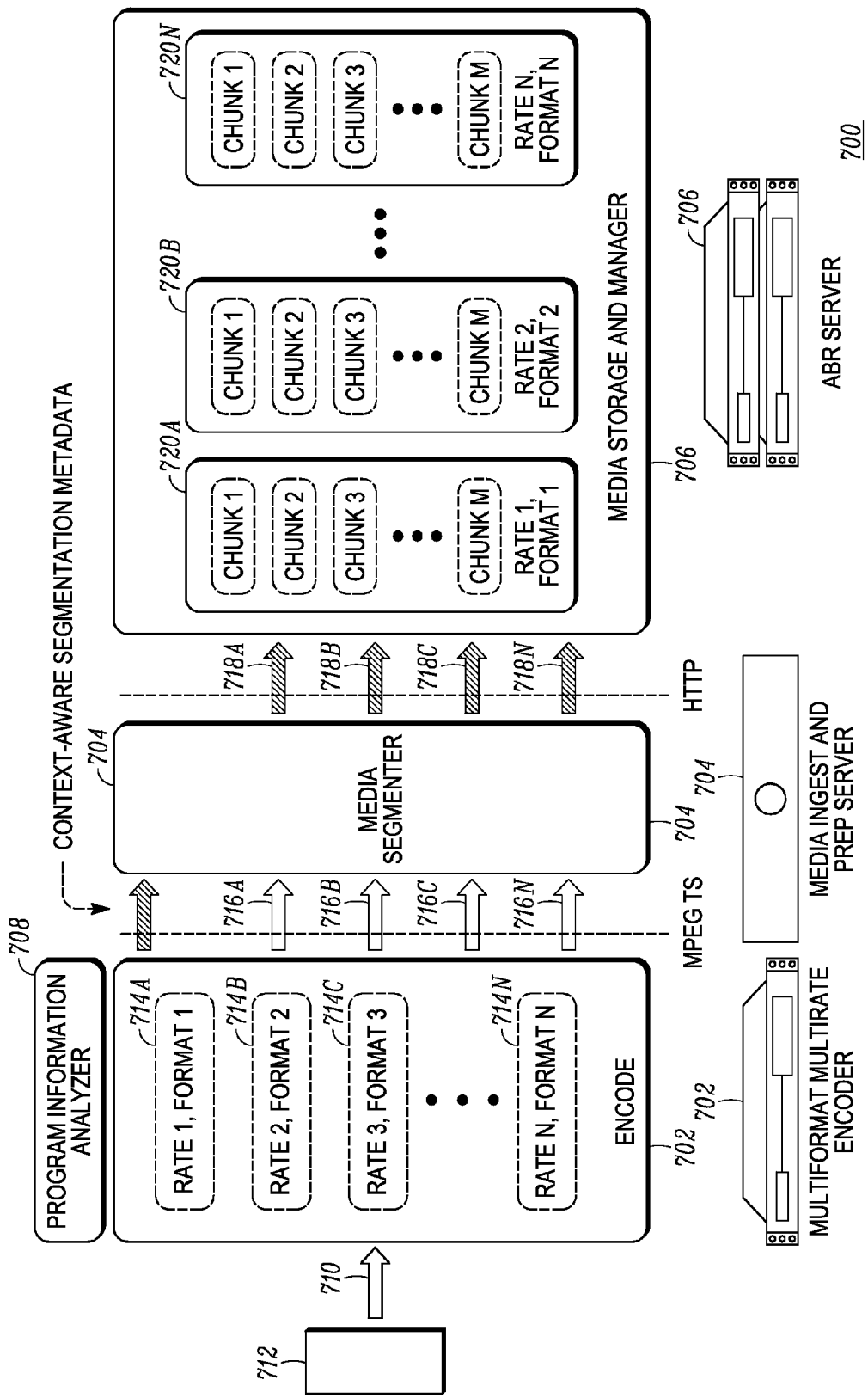
FIG. 7 illustrates an ABR streaming system that utilizes variable duration segments according to program information in accordance with embodiments of the present invention.

FIGS. 4-7 illustrated different embodiments of an ABR streaming system. FIG. 4 shows an ABR streaming system 400 in which the content analyzer is a scene change analyzer 408. Thus, the media segmenter 404 provides the ABR server 406 with variable duration segment signals 418a-n where scene changes are used to designate discontinuities. FIG. 5 shows an ABR streaming system 500 in which the content analyzer is an ad avail analyzer 508. Thus, the media segmenter 504 provides the ABR server 406 with variable duration segment signals 518a-n where the presence of ad avails are used to designate discontinuities. FIG. 6 shows an ABR streaming system 600 in which the content analyzer is a channel change analyzer 608. Thus, the media segmenter 604 provides the ABR server 406 with variable duration segment signals 618a-n where channel changes selected by a client are used to designate discontinuities. FIG. 7 shows an ABR streaming system 700 in which the content analyzer is a program access information analyzer 708. Thus, the media segmenter 704 provides the ABR server 706 with variable duration segment signals 418a-n where program access information that is provided in the media content by media content providers or operators are used to designate discontinuities.

FIG. 8 illustrates a prior art rendition of streaming media content 800. As shown, each of the segments 802 has the same duration even though the segments may have different bandwidths and contain different number of bytes. The ABR streaming server 804 streams the media content to clients using the fixed duration media segments 802. In addition, a discontinuity 806 in the media stream is shown. The discontinuity 806 is shown during one of the media segments 808. It is possible that the discontinuity 806 occurs at the end of one media segment and the beginning of another media segment, but as a part of the prior art there is no correlation between the duration of a media segment within the streaming media content or the start and end points of a media segment with the discontinuity within the media content regardless of the reason for the discontinuity.

FIG. 9 illustrates a rendition of streaming media content 900 when the discontinuities within the media content are taken into consideration. In this embodiment, the ABR server 902 is part of a content aware system. A media analyzer can determine the presence of the discontinuity 904 within the media stream 906. As described above, the duration of at least one the media segment 908 can be adjusted so that the end of one media segment ends at the point in the media stream 906 where the discontinuity 904 occurs so that the end point of the variable media segment is aligned with the discontinuity. The remaining media segments 910 can have the same duration. As seen, the duration of media segment 908 is extended so that it ends at the discontinuity. It is understood, however, that the duration of the media segments 910 can be adjusted so that media segment 908 is decreased as compared to the media segments 910. In addition, multiple media segments within the media stream 906 can have different durations.

FIG. 10 is a prior art rendition of streaming media content 1000 that includes a discontinuity 1002 when a scene changes during the streaming media content. The streaming media content 1000 is provided by ABR streaming server 1004. As shown, each of the segments 1006 has the same duration such that the discontinuity occurs in the middle of segment 1008. FIG. 11 illustrates streaming media content 1100 wherein the context-ABR server 1102 determines the time and place of the discontinuity 1104 that occurs in the media stream 1100 by a scene change. Understanding the position of the discontinuity in the streaming media content 1100, the duration of the media segments can 1106 vary from one segment to another segment. As seen, the duration media segment 1108 has been extended so that it is longer than the other media segments. Thus, the end of media segment 1108 ends when the discontinuity 1104 caused by the scene change occurs in the streaming media content so that the end point of the variable media segment is aligned with the discontinuity. It is understood that the duration of media segment 1108 can be decreased as compared to the other segments 1106 in the streaming media content 1100 depending on the duration of the other segments 1106. In addition, each of the media segments 1106, 1108 can have different durations such that the end of one media segment coincides with the location of the discontinuity 1104 caused by the scene change in the streaming media content.

Figure 12:
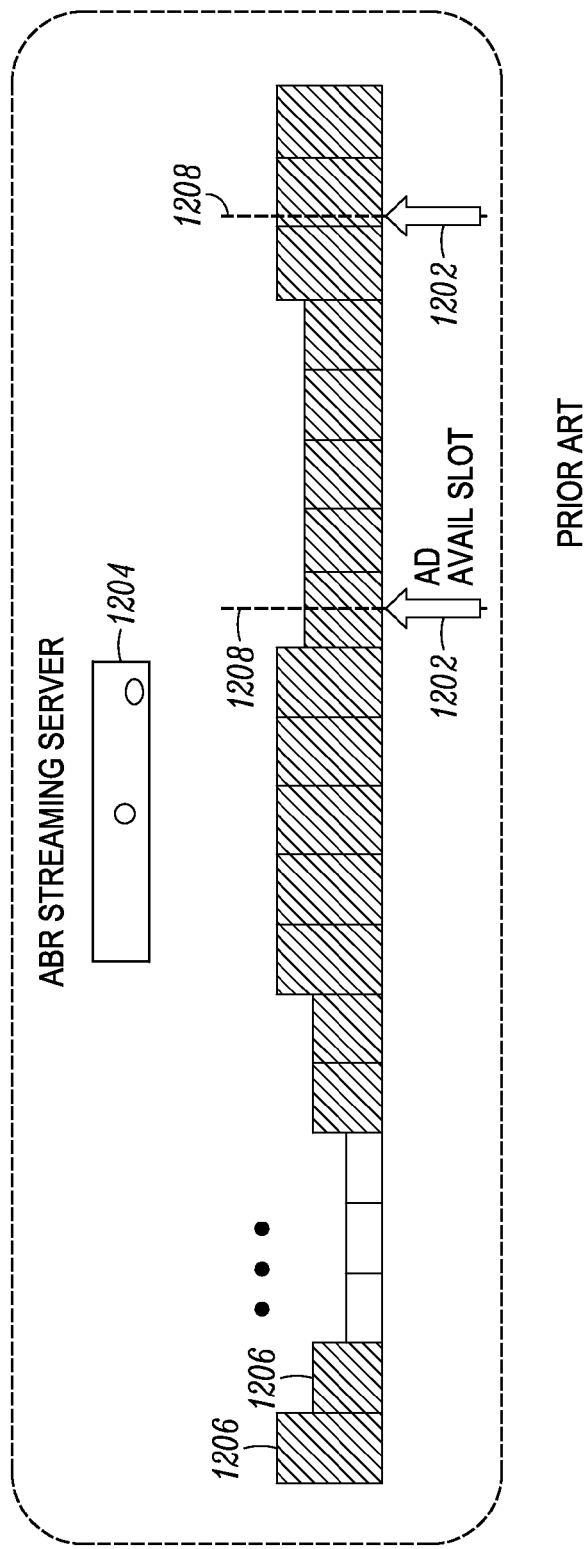
FIG. 12 illustrates fixed duration segments with ad avail discontinuities occurring in a segment according to the prior art.

FIG. 12 is a prior art rendition of streaming media content 1200 that includes a discontinuities 1202 in between which an ad avail occurs during the streaming media content. The ad avail indicates the places within the streaming media content that an advertisement can be inserted into the media content. The streaming media content 1200 is provided by ABR streaming server 1204. As shown, each of the segments 1206 has the same duration such that the ad avail discontinuities occur in the middle of segments 1208. FIG. 13 illustrates the prior art such that it is unclear when to end the streaming media content and to start the advertisements during the ad avail opportunity in consideration of when the discontinuities that occur during segments 1208. In addition, it is unclear when to end the advertisement and restart the media stream.

FIG. 14 illustrates streaming media content 1400 wherein the context-ABR server 1402 determines the time and place of the discontinuities 1404 that occurs in the media stream 1100 taking into account the ad avails. Understanding the position of the discontinuities in the streaming media content 1400, the duration of the media segments 1406 can vary from one segment to another segment. As seen, the duration media segment 1408 has been decreased so that it is shorter than the other media segments. Thus, the end of media segment 1408 ends when the discontinuity 1404 caused when the ad avail occurs in the streaming media content so that the end point of the variable media segment is aligned with the discontinuity. It is understood that the duration of media segment 1408 can be extended as compared to the other segments 1406 in the streaming media content 1400 depending on the duration of the other segments 1406. In addition, the duration of the segments of the advertisement during the ad avail can be adjusted. As seen, the duration one segment 1407 is increased as compared to the other segments for the advertisement. Each of the media segments 1406, 1407, 1408 can also have different durations such that the end of one media segment coincides with the location of the discontinuities 1404 caused by the use of the ad avail in the streaming media content.

FIG. 15 is a prior art rendition of streaming media content 1500 that includes a discontinuity 1502 caused by a channel change during the streaming media content. The streaming media content 1500 is provided by ABR streaming server 1504. As shown, each of the segments 1506 has the same duration such that the discontinuity occurs in the middle of segment 1508. FIG. 16 illustrates streaming media content 1600 wherein the context-ABR server 1602 determines the time and place of the discontinuity 1604 that occurs in the media stream 1600 by a channel change. The channel change is caused by the client of the media stream and occurs such that there is time for the system to modify the duration of the segments according to the principles described. Understanding the position of the discontinuity in the streaming media content 1600, the duration of the media segments can 1606 vary from one segment to another segment. As seen, the duration media segment 1608 has been decreased so that it is shorter than the other media segments. Thus, the end of media segment 1608 ends when the discontinuity 1604 caused by the channel change occurs in the streaming media content so that the end point of the variable media segment is aligned with the discontinuity. It is understood that the duration of media segment 1608 can be extended or increased as compared to the other segments 1606 in the streaming media content 1600 depending on the duration of the other segments 1606. In addition, each of the media segments 1606, 1608 can have different durations such that the end of one media segment coincides with the location of the discontinuity 1604 caused by the scene change in the streaming media content.

Figure 17:
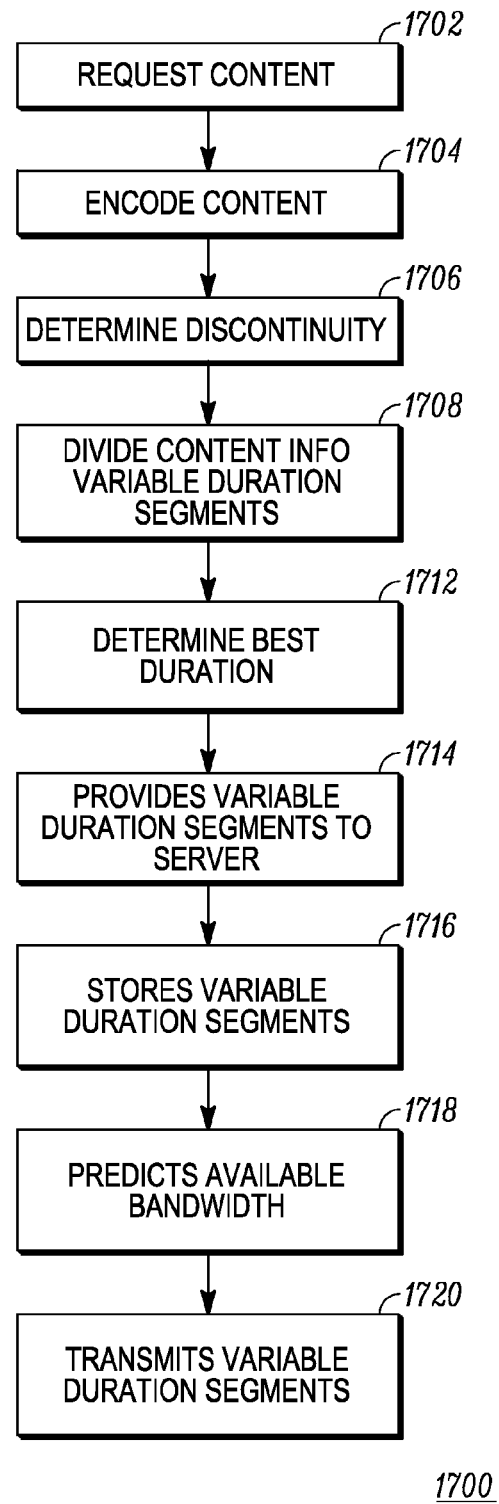
FIG. 17 is a flow chart of a method of operation of an adaptive bit rate system using variable duration segments according to an embodiment of the present invention.

FIG. 17 is a flow chart that shows the operation of an ABR system that streams media content using variable duration segments. The process begins with a device 202 requesting 1702 content from a media content provider. The media content provider supplies the media content to the device by streaming the media content using variable duration segments. In order to stream the media content, an encoder encodes 1704 the streaming media content using known protocols. The encoder can use multirate and multiformat encoding.

The content analyzer reviews the streaming content to determine 1706 the time and places within the media content of any discontinuities. The discontinuities can occur based on scene changes, channel changes, the insertion of ad avails, program access information and any combination of these. In an embodiment, the media content analyzer analyzes the streaming media content for the boundaries in the streaming media content that are caused by the discontinuities. The boundaries are a result of the scene changes, ad avails, channel changes and program access information. Other discontinuities can be determined based on the program information that is determined by the content analyzer.

With the information of where the discontinuities are located within the streaming media content, the media segmenter divides 1708 the streaming media content into a plurality of variable duration segments. As is understood, at least one of the variable media content segments has a duration different from the other of the variable media content segments. Thus, the end of a variable media content server ends when the discontinuity occurs in the streaming media content server so that the end point of the variable media segment is aligned with the discontinuity. The media segmenter 308 can determine 1712 the best duration for each of the segments. For example, the discontinuity can occur because of a scene change in the streaming media content. Thus, the variable duration segment that occurs just before the discontinuity can be extended or decreased as compared to the duration of the other variable duration segments so that the end of that extended/decreased variable media segment is aligned with the discontinuity in the streaming media content. The start points and the end points of the variable media segments can be designated using metadata, which can be encoded into the streaming media content.

The media segmenter provides 1714 the variable duration segments to the ABR server. The ABR server can store 1716 the variable duration segments. In an embodiment, a device 202 can predict 1718 the available bandwidth between the media server and the device for the transmission of the variable duration segments. Based on the available bandwidth, the device may request any of a plurality of the variable duration segments to be transmitted from the media server to the device. The media server transmits the requested variable duration segments to 1720 to the device 202.

Figure 18A:
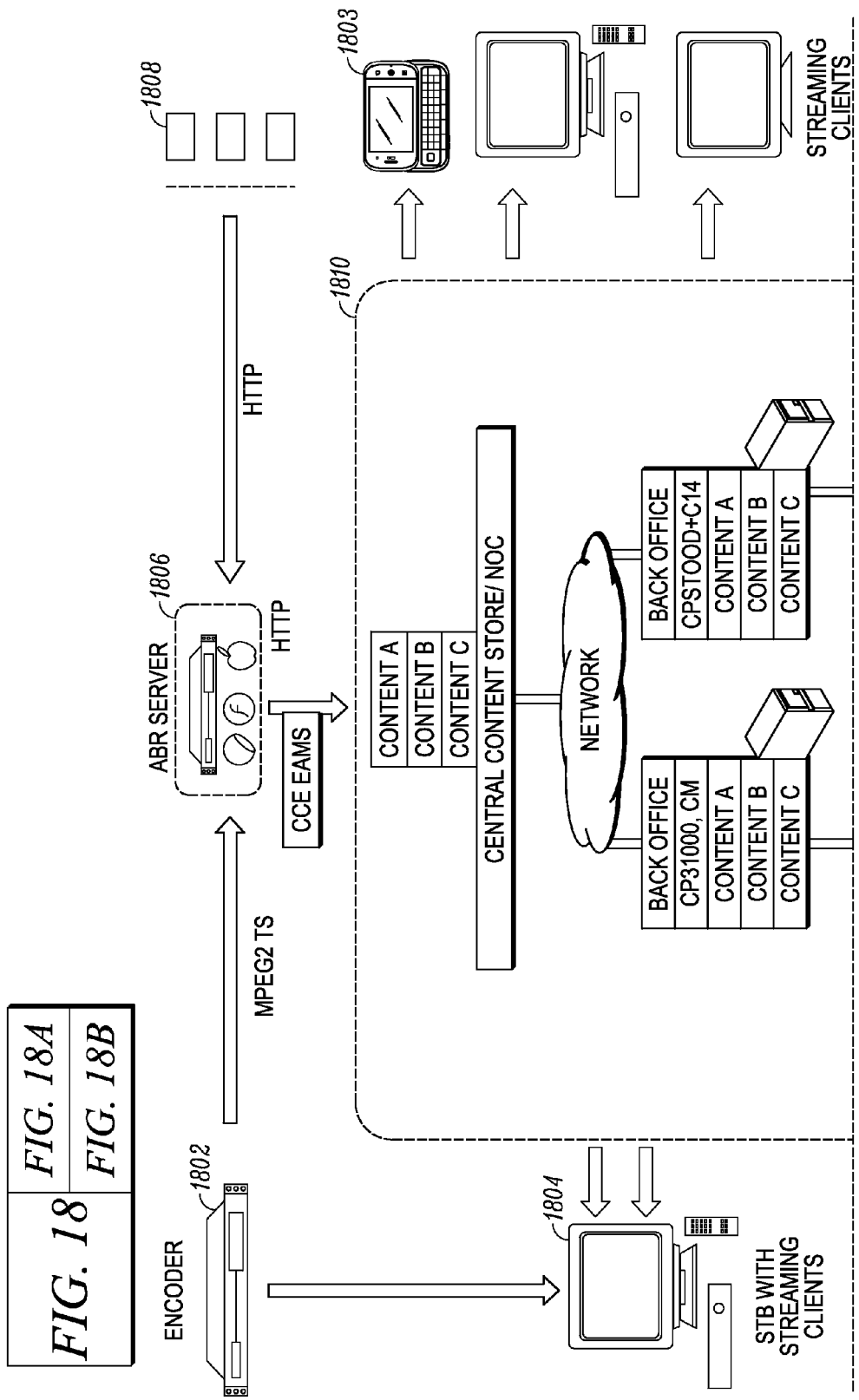
FIGS. 18a and 18b illustrates a use case for variable duration adaptive bit rate streaming media content according to an embodiment of the present invention.
Figure 18B:
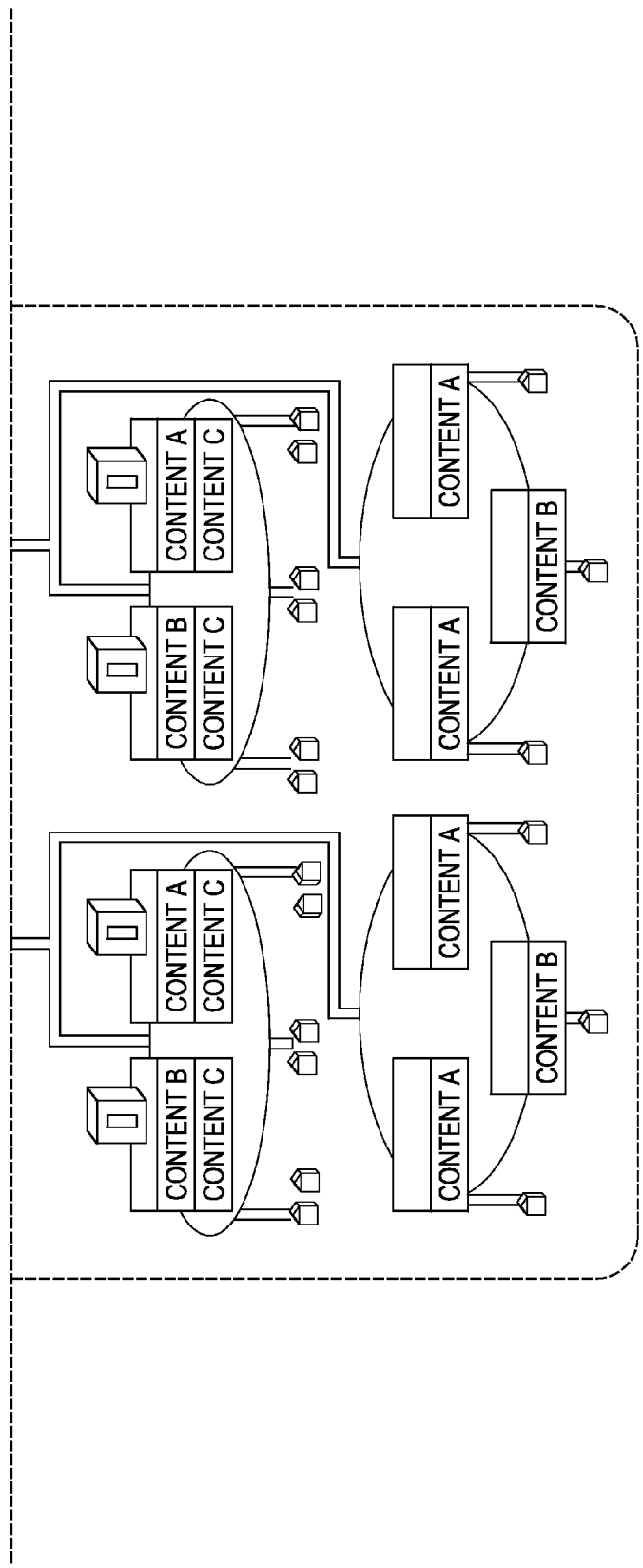

FIG. 18 illustrates a possible use case for the variable duration segments provided by the ABR server. As shown, multirate multiformat encoder 1802 can provide streaming media content to a set top box (STB) 1804 that can be provided with a streaming client. The encoder 1802 can also provide the streaming media content to an ABR server 1806 using MPEG TS. The ABR server can also receive media content from other sources 1808, and this content can be provided using HTTP protocols. The ABR server 1806 communicates with a central network 1810 that communicates with streaming clients 1803 as well as STB 1804, as well as mobile devices, a computer, and suitably equipped television. The ABR server provides variable duration segments by determining the location of discontinuities in the media content provided by the encoder 1802 and the sources 1808.

Figure 19:
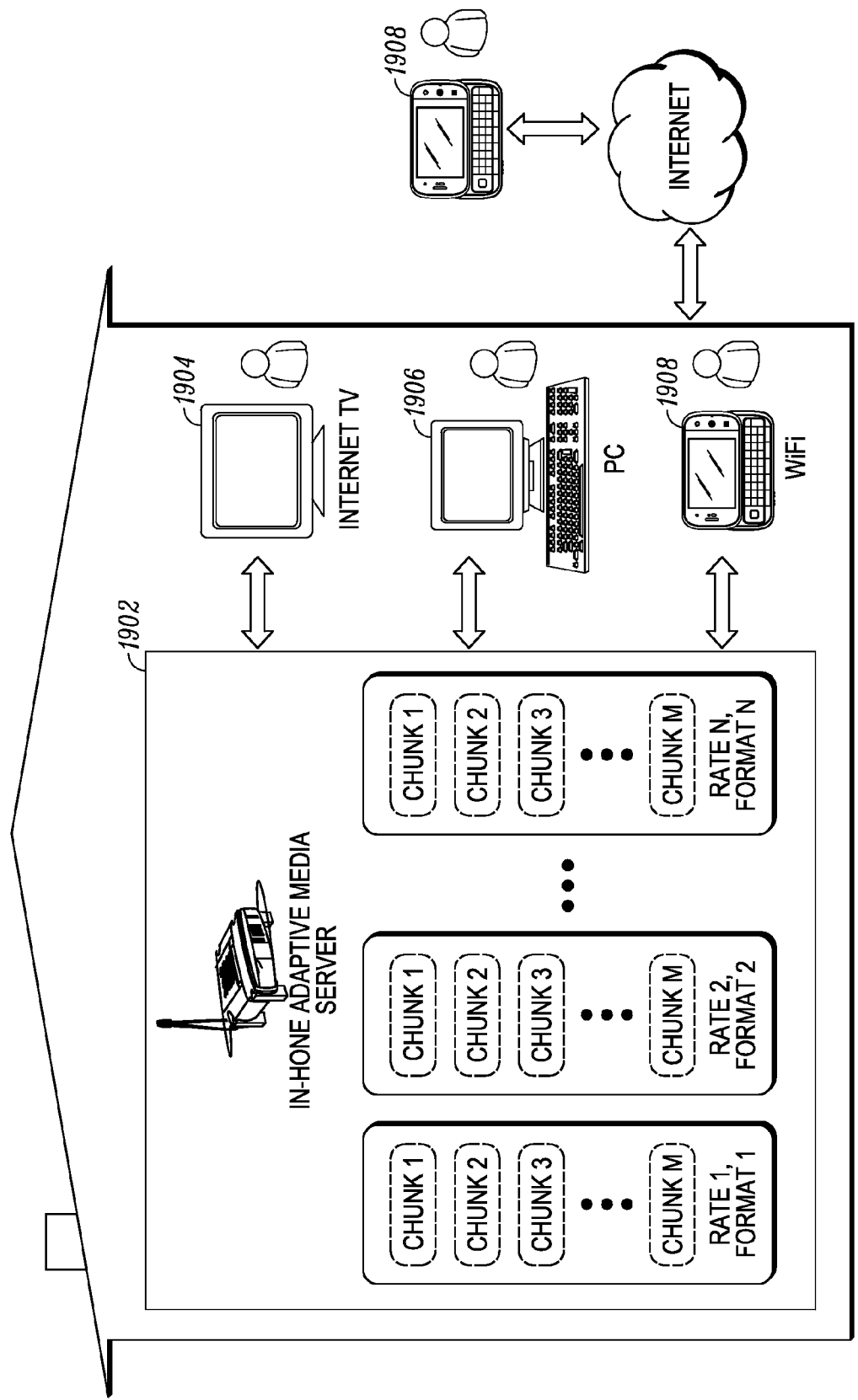
FIG. 19 illustrations another use case for variable duration adaptive bit rate streaming media content according to an embodiment of the present invention.

FIG. 19 illustrates another possible use case for variable duration segments provided by an ABR server. A home adaptive server 1902 provides the variable duration segments to various devices including televisions 1904, personal computers 1906, mobile devices 1908 including WiFi devices and other equipment. The home adaptive server 1902 receives the streaming media content from a media operator. The home adaptive server 1902 determines the location of discontinuities in the streaming media content. Those discontinuities can occur from the media content provider, e.g. scene changes, program access information, the media operators, e.g. ad avails, or the devices 1904-1908, e.g. channel changes. The home adaptive server 1902 then divides the streaming media content into a plurality of variable duration segments so that the end of at least one of the variable media segments is aligned with the discontinuity.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method comprising:
   streaming media content at a server;
   determining a discontinuity in streaming media content using a content analyzer executed by a processor, wherein determining the discontinuity in the streaming media content comprises analyzing the streaming media content for boundaries where the streaming media content changes;
   dividing the streaming media content into a plurality of variable duration segments using a media segmenter executed by the processor, wherein a first segment of the plurality of variable duration segments has a first duration that is different from a second segment of the plurality of variable duration segments that has a second duration, wherein the second duration is to be adjusted based on the determined discontinuity, and wherein the second segment having the adjusted second duration is to end at the determined discontinuity in the streaming media content; and
   transmitting the plurality of variable duration segments of the streaming media content from the server.

2. The method of claim 1 wherein analyzing the content of the streaming media content for boundaries comprises at least one of:

analyzing the streaming media content for scene change boundaries;
analyzing the streaming media content for ad avail boundaries;
analyzing the streaming media content for channel changes, or
analyzing the streaming media content for program access information.

3. The method of claim 1 wherein analyzing the content of the streaming media content comprises using multiple rates and multiple formats.

4. The method of claim 1 wherein dividing the streaming media content into a plurality of variable duration segments comprises:
determining the second duration of the second segment of the plurality of variable duration segments; and
extending the second duration of the second segment of the plurality of variable duration segments from the first duration of the first of the plurality of variable duration segments so that the second segment of the plurality of variable duration segments ends at the determined discontinuity in the streaming media content.

5. The method of claim 1, wherein dividing the streaming media content into a plurality of variable duration segments comprises:
determining the second duration of the second of the plurality of variable duration segments; and
decreasing the second duration of the second of the plurality of variable duration segments from the first duration of the first of the plurality of variable duration segments so that the second of the plurality of variable duration segments ends at the determined discontinuity in the streaming media content.

6. The method of claim 1 further comprising encoding the streaming media content.

7. The method of claim 6 wherein encoding the streaming media content comprises creating metadata that signals a start point and an endpoint of the variable duration segments.

8. The method of claim 1 wherein dividing the streaming media content into a plurality of variable duration segments comprises aligning determined discontinuities with an endpoint of the first of the plurality of variable duration segments.

9. The method of claim 1 further comprising:
determining a best segment duration for the plurality of variable duration segments.

10. An apparatus comprising:
a memory; and
a processor operatively coupled to the memory, the processor to:
analyze streaming media content for boundaries where the streaming media content changes to determine a discontinuity in the streaming media content;
divide the streaming media content into a plurality of variable duration segments, wherein a first segment of the plurality of variable duration segments has a first duration that is different from a second segment of the plurality of variable duration segments that has a second duration, wherein the second duration is to be adjusted based on the determined discontinuity, and wherein the second segment having the adjusted second duration is to end at the determined discontinuity in the streaming media content;
encode the plurality of variable duration segments of the streaming media content, and
store the plurality of variable duration segments of the streaming media content.

11. The apparatus of claim 10, the processor to perform at least one of:
determine changes in scenes as a discontinuity in the streaming media content;
determine ad avails as a discontinuity in the streaming media content;
determine channel changes as a discontinuity in the streaming media content, or
determine changes in content as a discontinuity in the streaming media content.

12. The apparatus of claim 10 wherein the processor is to determine the second duration of the second of the plurality of variable duration segments and extend the second duration of the second of the plurality of variable duration segments from the first duration of the first of the plurality of variable duration segments so that the second of the plurality of variable duration segments ends at the determined discontinuity in the streaming media content.

13. The apparatus of claim 10 wherein the processor is to determine the second duration of the second of the plurality of variable duration segments and decrease the second duration of the second of the plurality of variable duration segments from the first duration of the first of the plurality of variable duration segments so that the second of the plurality of variable duration segments ends at the determined discontinuity in the streaming media content.

14. The apparatus of claim 10 wherein the processor is to store and manage the plurality of variable duration segments.

15. The apparatus of claim 10 wherein the processor is to determine start points and endpoints of the variable duration segments and provide the start points and the endpoints to a media segmenter.

16. The apparatus of claim 10 wherein the processor is to align the determined discontinuities with an endpoint of the one of the plurality of variable duration segments.

17. The apparatus of claim 10 wherein the processor is to analyze the streaming media content using multiple rates and multiple formats.

18. A non-transitory computer readable storage medium having instructions encoded thereon which, when executed by a processor, cause the processor to perform operations comprising: streaming media content;
determining, by the processor, a discontinuity in streaming media content, wherein determining the discontinuity in the streaming media content comprises analyzing the streaming media content for boundaries where the streaming media content changes;
dividing the streaming media content into a plurality of variable duration segments, wherein a first segment of the plurality of variable duration segments has a first duration that is different from a second segment of the plurality of variable duration segments that has a second duration, wherein the second duration is to be adjusted based on the determined discontinuity, and wherein the second segment having the adjusted second duration is to end at the determined discontinuity in the streaming media content; and
transmitting the plurality of variable duration segments of the streaming media content from the server.

19. The non-transitory computer readable storage medium of claim 18 wherein analyzing the content of the streaming media content for boundaries comprises at least one of:
analyzing the streaming media content for scene change boundaries;
analyzing the streaming media content for ad avail boundaries;

analyzing the streaming media content for channel changes, or analyzing the streaming media content for program access information.

20. The non-transitory computer readable storage medium of claim 18 wherein analyzing the content of the streaming media content comprises using multiple rates and multiple formats.

21. The non-transitory computer readable storage medium of claim 18 wherein dividing the streaming media content into a plurality of variable duration segments comprises:

determining the second duration of the second segment of the plurality of variable duration segments; and extending the second duration of the second segment of the plurality of variable duration segments from the first duration of the first of the plurality of variable duration segments so that the second segment of the plurality of variable duration segments ends at the determined discontinuity in the streaming media content.

22. The non-transitory computer readable storage medium of claim 18, wherein dividing the streaming media content into a plurality of variable duration segments comprises:

determining the second duration of the second of the plurality of variable duration segments; and decreasing the second duration of the second of the plurality of variable duration segments from the first duration of the first of the plurality of variable duration segments so that the second of the plurality of variable duration segments ends at the determined discontinuity in the streaming media content.

23. The non-transitory computer readable storage medium of claim 18 wherein dividing the streaming media content into a plurality of variable duration segments comprises aligning determined discontinuities with an endpoint of the first of the plurality of variable duration segments.

24. The non-transitory computer readable storage medium of claim 18, wherein the operations further comprise:

determining a best segment duration for the plurality of variable duration segments.

* * * * *